United States Patent
Prudent

(10) Patent No.: US 9,125,227 B2
(45) Date of Patent: Sep. 1, 2015

(54) COMMUNICATIONS DEVICE FOR A WIRELESS AND LAND-LINE NETWORK

(75) Inventor: Shroeder Prudent, Brooklyn, NY (US)

(73) Assignee: Verizon New York Inc., New York, NY (US)

( * ) Notice: Subject to any disclaimer, the term of this patent is extended or adjusted under 35 U.S.C. 154(b) by 1519 days.

(21) Appl. No.: 10/987,915

(22) Filed: Nov. 12, 2004

(65) Prior Publication Data

US 2005/0101347 A1    May 12, 2005

Related U.S. Application Data

(60) Provisional application No. 60/519,099, filed on Nov. 12, 2003.

(51) Int. Cl.
| | |
|---|---|
| *H04M 1/00* | (2006.01) |
| *H04W 88/02* | (2009.01) |
| *H04M 1/738* | (2006.01) |
| *H04M 1/725* | (2006.01) |
| *H04M 11/06* | (2006.01) |
| *H04W 84/14* | (2009.01) |

(52) U.S. Cl.
CPC .......... *H04W 88/021* (2013.01); *H04M 1/7385* (2013.01); *H04M 1/72502* (2013.01); *H04M 11/066* (2013.01); *H04W 84/14* (2013.01)

(58) Field of Classification Search
USPC ............... 455/555, 426.1, 462.1, 419, 435.1, 455/556.1, 562.1, 557; 370/338
See application file for complete search history.

(56) References Cited

U.S. PATENT DOCUMENTS

| | | | | |
|---|---|---|---|---|
| 5,351,284 | A | * | 9/1994 | Rogers ....................... 455/562.1 |
| 5,675,629 | A | * | 10/1997 | Raffel et al. ............... 455/552.1 |
| 5,722,087 | A | | 2/1998 | Ala-Mursula et al. |
| 5,915,224 | A | * | 6/1999 | Jonsson ..................... 455/552.1 |
| 6,141,560 | A | * | 10/2000 | Gillig et al. ................ 455/553.1 |
| 6,253,088 | B1 | * | 6/2001 | Wenk et al. .................... 455/462 |
| 6,584,175 | B1 | * | 6/2003 | Kibria et al. ................. 379/1.03 |
| 2002/0094776 | A1 | | 7/2002 | Pulver |
| 2002/0155819 | A1 | * | 10/2002 | Trombatore ................. 455/74.1 |
| 2002/0177448 | A1 | * | 11/2002 | Moran et al. .................. 455/456 |
| 2003/0045306 | A1 | | 3/2003 | Himmel et al. |
| 2004/0017077 | A1 | | 1/2004 | Vyse et al. |
| 2004/0176077 | A1 | | 9/2004 | Loveland |

FOREIGN PATENT DOCUMENTS

| | | |
|---|---|---|
| EP | 0647074 | 4/1995 |
| JP | 8-265856 A | 10/1996 |
| JP | 2000-134356 A | 5/2000 |
| WO | 96/32824 | 10/1996 |
| WO | 00/64200 | 10/2000 |

* cited by examiner

Primary Examiner — Chuck Huynh

(57) ABSTRACT

A telecommunications converter module is disclosed. The telecommunications converter module includes a connection port configured to connect to a wireless communication device and an interface to a land-line communication network. The telecommunications converter module further includes a processor, in communication with said data port and said interface, that is configured to convert wireless telecommunication signals to land-line telecommunication signals and to convert land-line telecommunication signals to wireless telecommunication signals.

19 Claims, 2 Drawing Sheets

COMMUNICATIONS DEVICE FOR A WIRELESS AND LAND-LINE NETWORK

CROSS REFERENCE TO RELATED APPLICATIONS

This application is an original patent application based on provisional application Ser. No. 60/519,099, filed Nov. 12, 2003, and derives its priority therefrom.

TECHNICAL FIELD

The present invention relates generally to a communications system for transmission and reception of voice and/or data over a wireless network using conventional land-line telephone equipment.

BACKGROUND

Cellular, Personal Communications Systems (PCS) and other types of wireless telephones that receive and transmit telephone calls on wireless networks have become commonplace. Indeed, wireless telephones have become so popular that some people have discontinued their conventional land-line home telephone service in favor of just having a wireless telephone service. In this way, users reduce their costs by eliminating their conventional land-line telephone service. However, drawbacks to eliminating the conventional home land-line service exist. For example, health concerns may be associated with extended periods of using a wireless telephone in close proximity to a user's body. Further, some users find it inconvenient not to have multiple telephones in various places of their home, as with conventional land-line telephone systems. Additionally, wireless telephone signals sometimes experience interference in various places of a house as the wireless telephone is moved from place to place. For these and other reasons, many people continue to maintain both a wireless telephone service (primarily for use outside of the home) and a conventional land-line telephone service for use at home.

The embodiments described hereinafter were developed in light of these and other disadvantages of existing communication systems.

SUMMARY

A converter device is disclosed for enabling conventional land-line communication equipment, including land-line telephones, modems, etc., to place and receive calls over a wireless telephone network.

BRIEF DESCRIPTION OF THE DRAWINGS

These and other features and advantages will be apparent from the following detailed description and the appended claims, taken in conjunction with the accompanying drawings, in which:

DETAILED DESCRIPTION

Figure 1:
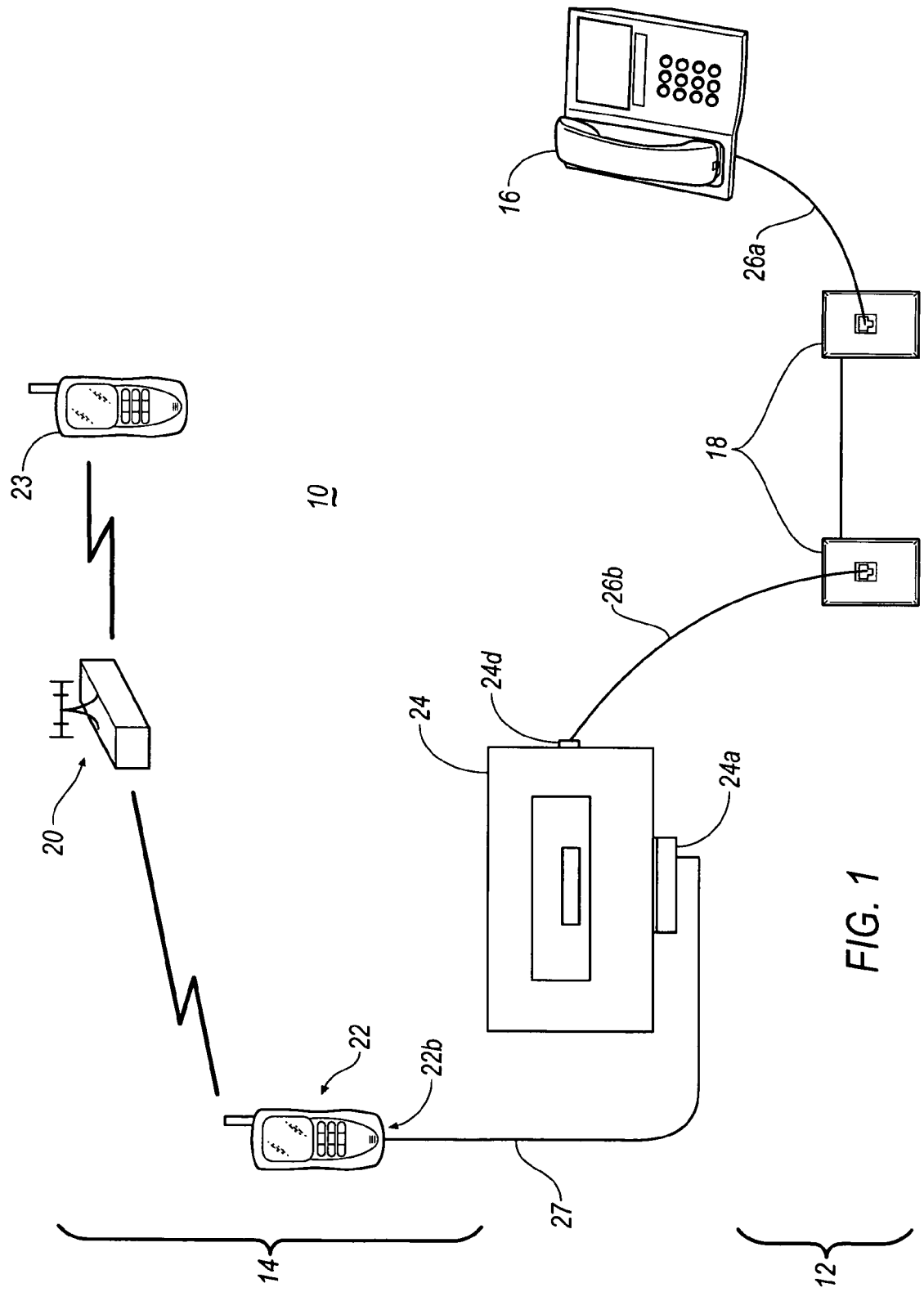
FIG. 1 is a diagram of a communications system, according to an exemplary embodiment, having a converter device that enables conventional land-line communication devices to place and/or receive calls on a wireless network.

Referring to FIG. 1, a communications system 10 is illustrated that includes a land-line network 12 and a wireless network 14. As described in detail below, land-line network 12 is connected to wireless network 14 through converter 24. Land-line network 12 is the hard-wired telephone network that is commonplace in most residential homes. In FIG. 1, land-line network 12 is illustrated as having two conventional telephone wall jacks 18 and a telephone 16 plugged into one of the wall jacks 18 via conventional telephone wire 26(a). Of course, land-line network 12 may include any number of wall jacks 18 distributed throughout the home and networked in a conventional manner. Any number of land-line telephones 16 (corded or cordless), modems (not shown) or other types of communication devices can be plugged into wall jacks 18.

Wireless network 14 may be a cellular, PCS, or any other type of wireless communication network used for wireless telephone communications. In a conventional manner, wireless telephone 22 communicates with other wireless telephones, e.g., wireless telephone 23, through a base station 20. Specifically, wireless telephone 22 can be used to send and receive telephone calls with other wireless telephones and with conventional land-line phones on the plain old telephone system (POTS), in manners known in the art, when the wireless telephone 22 is not connected to converter 24. When wireless telephone 22 is connected to converter 24 (as shown in FIG. 1), wireless telephone 22 and converter 24 together enable conventional land-line communication equipment (e.g., telephones) to place and receive telephone calls over the wireless network 14.

Converter 24 provides an interface between the hard-wired telephone network 12 in a user's home to a wireless network 14. Converter 24 is illustrated in FIG. 1 as being connected to the hard-wired home telephone network by simply connecting a line interface 24(d) of converter 24 to a conventional wall jack 18 via telephone wire 26(b), though other means for connecting converter 24 to the hard-wired home telephone network are envisioned and within the scope of the invention. An input/output port 24(a) of converter 24 is detachably connected to wireless telephone 22 via wire 27 to provide a communication path between wireless telephone 22 and converter 24. In some embodiments, converter 24 is connected to wireless telephone 22 through an existing data input/output connection on the wireless telephone 22. Wire 27 may be a serial, USB, or other appropriate connecting cable. Preferably, converter 24 is located within a building (e.g., residential home) where the wireless signal is strongest and the wireless telephone 22 receives the clearest signal.

Figure 2:
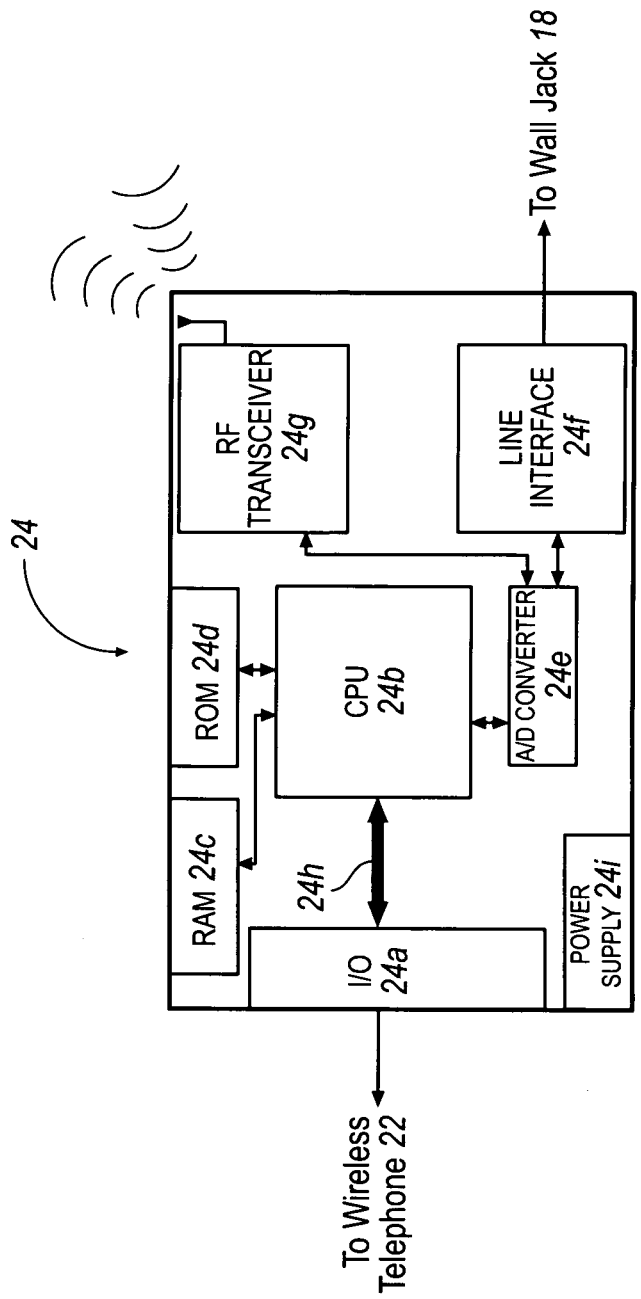
FIG. 2 is an exemplary block diagram of the communications device of FIG. 1, according to an embodiment.

Referring now to FIG. 2, a detailed block diagram of converter 24 is shown. As illustrated, converter 24 includes an input/output (I/O) port 24(a), a central processing unit (CPU) 24(b), RAM and ROM memory 24(c) and 24(d), an analog-to-digital (A/D) converter 24(e), a line interface 24(f), radio frequency (RF) transceiver 24(g), data bus 24(h), and power supply 24(i). Other embodiments of the converter 24 are envisioned and within the scope of the invention. In this embodiment, CPU 24(b) provides the processing capabilities of converter 24. For example, CPU 24(b) converts wireless telephone signals to conventional analog telephone signals and vice versa. CPU 24(b) communicates with RAM memory 24(c) and ROM memory 24(d) in conventional manners to store and retrieve data and operating instructions. CPU 24(b) communicates with wireless telephone 22 via I/O port 24(a) over two-way data bus 24(h). Specifically, CPU receives wireless telephone communications from wireless telephone 22 and sends wireless telephone communications to wireless telephone 22 via data bus 24(h) and I/O port 24(a). Similarly, CPU 24(b) communicates with the hard-wired telephone network 12 through A/D converter 24(e) and line interface 24(f). Specifically, line interface 24(f) provides the interface connection to connect a telephone wire 26(b) between converter 24 and wall jack 18. A/D converter 24(e) converts analog voice/data signals from the hard-wired telephone network 12 to digital signals used by the CPU 24(b) and visa versa. As shown in FIG. 2, CPU 24(b) may additionally communicate to the hard-wired telephone network 12 in a wireless manner via RF transceiver 24(g). Either as a supplement to or in place of hard-wiring converter 24 to hard-wired network 12 (via line interface 24(f)), converter 24 may communicate directly to cordless land-line telephone devices (not shown) through RF transceiver 24(g). Specifically, RF transceiver 24(g), if employed, can receive and transmit wireless radio frequency signals to/from cordless hand-held telephone units in much the same manner that known 900 Mhz, 2.4 Ghz, and 5.8 Ghz base units currently communicate with cordless hand-held telephone units. Power supply 24(i) powers the circuitry of converter 24 and further provides the line voltage and ringing current used by the line interface 24(f) to generate rings in the land-line network 12.

Now, exemplary methods of processing telephone calls using converter 24 will be discussed. First, the situation where a phone call is initiated from a third-party (e.g., telephone 23) to a residence using a converter 24 is described. A call initiated from telephone 23 is routed through base station 20 and received by wireless telephone 22 in a conventional manner. Though FIG. 1 shows telephone 23 as a wireless telephone, a call initiated from a conventional land-line telephone would similarly be routed through base station 20 to wireless telephone 22 in a known manner. When wireless telephone 22 receives the call, wireless telephone 22 generates a ring signal, which is conveyed to converter 24 via I/O port 24(a). Converter 24 converts the wireless ring signal to a conventional ring signal for a land-line telephone system, which is output via line interface 24(f) and/or RF transceiver 24(g). This causes land-line telephones (e.g., telephone 16) connected to the hard-wired land-line network 12 to ring. When the user answers one of the land-line phones, an off-hook signal is generated. Converter 24 receives the off-hook signal through line interface 24(f) and/or RF transceiver 24(g) and converts it to a wireless telephone format, which is conveyed to wireless telephone 22. Then, wireless telephone 22 is placed into off-hook mode and the call is connected. Wireless voice/data signals are received from the calling party by wireless telephone 22. Converter 24 converts those wireless voice/data signals to analog voice/data signals and conveys them to land-line network 12. Similarly, land-line telephone 16 sends analog voice/data signals to converter 24, which converts them to wireless voice/data signals and conveys them to wireless telephone 22. Wireless telephone 22 sends the wireless voice/data signals to the third-party caller in a conventional wireless manner. In this way, two-way communication is established between a conventional land-line telephone and a third-party caller (calling from either a wireless telephone or conventional land-line phone) via a wireless network.

Now, a method where a user of the land-line network 12 initiates a call to a third-party will be described. When a user initiates a call by picking up a land-line telephone (e.g., telephone 16) (either corded or cordless phone), a conventional off-hook signal is generated. Converter 24 receives the off-hook signal through line interface 24(f) and/or RF transceiver 24(g). Converter 24 converts the off-hook signal to a wireless network format compatible with the wireless network 14. Wireless telephone 22 receives the off-hook signal and goes into an off-hook mode. The user then dials the desired number on the land-line phone 16, which is also converted to the wireless network format by converter 24. Wireless telephone 22, in response to the signals, dials the corresponding number that is routed through base station 20 to the called party (e.g., wireless telephone 23). When the called party picks up, the call is completed between the land-line phone 16 and the called party via the wireless network.

In an alternative embodiment, a cell phone cartridge or "clone" cartridge can be used in place of wireless telephone 22 in the system to achieve the same end result. A clone cartridge is a device that is capable of sending and receiving wireless voice/data signals like a normal wireless telephone. However, a clone cartridge does not have any buttons, so the only means of input and output with a clone cartridge is through an I/O interface of the clone cartridge, which, when used with converter 24, is connected to I/O port 24(a) through wire 27. The use of a clone cartridge would allow the converter 24 to have the full functionality described hereinabove without the need to connect the user's wireless telephone 22 to the system. This arrangement would provide the benefit of maintaining the functionality of the land-line system as described above while the wireless telephone 22 is away from the house. Moreover, it provides the additional convenience of not having to constantly plug and unplug the wireless telephone 22 into the system.

The above-described embodiment provides a system where conventional land-line telephones and other communication devices can place and receive calls via a wireless network. In the described system, the user does not have to directly use the wireless telephone 22, thereby reducing some of the possible health concerns associated with wireless telephones. Further, the system allows a user to locate converter 24 where the wireless signal reception is strongest, thereby consistently providing a strong connection to third-party callers. In this way, users can enjoy many of the benefits of a land-line telephone without the expense of two telephone service billings. The user is billed only for use of wireless which connects to the non-user party and is not billed for use of user's landline telephone which connects only to the user's wireless telephone or clone. One skilled in the art, in light of this disclosure, will recognize other benefits associated with the described embodiments.

Various other modifications to the present invention may occur to those skilled in the art to which the present invention pertains. Other modifications not explicitly mentioned herein are also possible and within the scope of the present invention. For example, the foregoing description refers to communications received and/or initiated by the user utilizing a telephone as the land-line device 16. It is recognized however, that the above systems and processes are equally applicable to communications received and/or initiated by a computer or any other device capable of communicating on the land-line network 12. Accordingly, it is the following claims, including all equivalents, which define the scope of the present invention.

The invention claimed is:

1. A telecommunications converter module for use between a clone cartridge of a mobile telephone and a land-line communication network, said converter module comprising:
    a connection port configured to connect to said clone cartridge, said clone cartridge configured to receive and transmit wireless telecommunication signals on at least one of a wireless cellular or wireless PCS network, said clone cartridge lacking a tactile user interface;
    an interface to said land-line communication network; and
    a processor, in communication with said connection port and said interface, said processor configured to convert said wireless telecommunication signals received from at least one of said wireless cellular or wireless PCS networks through said clone cartridge to land-line telecommunication signals, and to convert land-line telecommunication signals to wireless telecommunication signals.

2. The converter module of claim 1, wherein said processor is configured to send wireless telecommunication signals to and receive wireless telecommunication signals from said clone cartridge through said connection port, and wherein said processor is configured to send land-line telecommunication signals to and receive land-line telecommunication signals from said land-line communication network through said interface.

3. The converter module of claim 1, wherein said converter module converts said telecommunication signals received from said clone cartridge independently of said mobile telephone being in communication with said converter module.

4. The converter module of claim 1, said clone cartridge being interchangeable with a mobile telephone.

5. The converter module of claim 1, wherein said converter module, in the absence of a plain old telephone system (POTS) network connection, converts all telecommunication signals received from said land-line network to telecommunication signals for transmission through said wireless cellular or wireless PCS network.

6. A telecommunication system, comprising:
a land-line communication network;
a clone cartridge of a mobile telephone configured to receive and transmit wireless communication signals on at least one of a wireless cellular or a wireless PCS network, said clone cartridge lacking a tactile user interface; and
a converter in communication with said land-line communication network and said clone cartridge, said converter configured to convert wireless telecommunication signals received from at least one of said wireless cellular or wireless PCS networks through said clone cartridge to land-line communication signals and to convert land-line communication signals to wireless telecommunication signals.

7. The system of claim 6, said clone cartridge being interchangeable with said mobile telephone.

8. The system of claim 6, wherein said clone cartridge and said converter collectively enable land-line communication devices to transmit and receive telephone calls over said wireless cellular or wireless PCS network.

9. The system of claim 6, said clone cartridge being interchangeable with said mobile telephone, wherein the converter converts said telecommunication signals received from said clone cartridge independently of said mobile telephone being in communication with said converter.

10. The system of claim 6, wherein said converter, in the absence of a plain old telephone system (POTS) network connection, converts all telecommunication signals received from said land-line communication network to telecommunication signals for transmission through said wireless cellular or wireless PCS network.

11. A method for communicating on a wireless telecommunication network using a land-line communication device, comprising:

receiving wireless communication signals at a clone cartridge of a mobile telephone over one of a wireless cellular or PCS network, said clone cartridge lacking a tactile user interface;
converting said wireless communication signals to land-line communication signals; and
sending said land-line communication signals to said land-line communication device over a land-line network.

12. The method of claim 11, further comprising:
generating land-line communication signals on said land-line network using said land-line communication device;
converting said land-line communication signals to wireless communication signals;
transmitting said wireless communication signals over said wireless cellular or PCS network using said clone cartridge.

13. The method of claim 11, said clone cartridge being interchangeable with a mobile telephone.

14. The method of claim 11, further including receiving a wireless ring signal; converting said wireless ring signal to a land-line ring signal and transmitting said land-line ring signal to said land-line communication device.

15. The method of claim 11, further including receiving an off-hook signal from said land-line communication device, converting said off-hook signal to a wireless communication format, and placing said clone cartridge into an off-hook mode.

16. The method of claim 11, further comprising receiving communication signals from said land-line network; and, in the absence of a plain old telephone system (POTS) network connection, converting said signals from said land-line network to wireless communication signals for transmission over the wireless cellular or wireless PCS network.

17. The method of claim 11, wherein said land-line communication device is a computer.

18. A system comprising:
a clone cartridge of a mobile telephone;
a telecommunications signal converter,
said converter configured to convert telecommunication signals received from a wireless network into land-line network telecommunication signals and to convert telecommunication signals received from a land-line network into wireless network telecommunication signals,
said wireless network being one of a wireless cellular and a wireless PCS network,
said converter configured to send and receive telecommunication signals over said wireless network through one of said clone cartridge and said mobile telephone, interchangeably,
wherein said converter may send and receive telecommunication signals over said wireless network through said clone cartridge while said mobile telephone is at a location remote from said converter, such that said mobile telephone and said converter both may send and receive telecommunication signals over said wireless network independently.

19. The system of claim 18, wherein said clone cartridge lacks a tactile user interface.

* * * * *